US010699601B2

(12) United States Patent
Lacy et al.

(10) Patent No.: US 10,699,601 B2
(45) Date of Patent: Jun. 30, 2020

(54) UNFURLING BANNER GREETING CARD AND THE LIKE

(71) Applicant: Hallmark Cards, Inc., Kansas City, MO (US)

(72) Inventors: Orlanda Lacy, Kansas City, MO (US); Kaitlyn Marie Jerome, Kansas City, MO (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 16/428,640

(22) Filed: May 31, 2019

(65) Prior Publication Data

US 2019/0287428 A1 Sep. 19, 2019

Related U.S. Application Data

(63) Continuation-in-part of application No. 15/879,119, filed on Jan. 24, 2018, now Pat. No. 10,475,360.

(51) Int. Cl.
*G09F 1/04* (2006.01)
*B42D 15/02* (2006.01)
(Continued)

(52) U.S. Cl.
CPC ............. *G09F 1/04* (2013.01); *B42D 15/022* (2013.01); *G09F 17/00* (2013.01); *G09F 27/00* (2013.01); *G09F 2027/002* (2013.01)

(58) Field of Classification Search
CPC ............ G09F 2011/0009; B43K 29/12; B42D 15/022
(Continued)

(56) References Cited

U.S. PATENT DOCUMENTS

| | | | |
|---|---|---|---|
| 948,506 | A | 2/1910 | Horton |
| 2,337,210 | A | 12/1943 | Soldati |

(Continued)

FOREIGN PATENT DOCUMENTS

| | | | |
|---|---|---|---|
| GB | 2112987 | A | 7/1983 |
| WO | 2007011109 | A1 | 1/2007 |

OTHER PUBLICATIONS

Combined Search and Examination Report under Sections 17 and 18(3) dated Jul. 10, 2019 in United Kingdom Patent Application No. GB1900937.2, 6 pages.

(Continued)

*Primary Examiner* — Joanne Silbermann
(74) *Attorney, Agent, or Firm* — Shook, Hardy & Bacon L.L.P.

(57) ABSTRACT

Embodiments comprise a greeting card with a self-retracting, pullout banner and an activation feature tied a movement of the self-retracting banner. The activation feature may include a visual or audio output and can be provided by an electronic component. The self-retracting banner may be affixed to an edge of the greeting card. A user may extend the banner by pulling the handle away from the greeting card. As such, the self-retracting banner is movable to and between a fully retracted and closed first position and a fully extended and open second position. The activation feature may be a sound activation feature that generates an audio output through a speaker when the self-retracting banner is moved out of the closed first position. Both the activation feature and the self-retracting banner can include content that may supplement a message or artwork included on panels of the greeting card.

20 Claims, 10 Drawing Sheets

(51) Int. Cl.
*G09F 27/00* (2006.01)
*G09F 17/00* (2006.01)

(58) Field of Classification Search
USPC ....... 40/514, 586, 603, 491, 124.01, 124.02, 40/124.03
See application file for complete search history.

(56) References Cited

U.S. PATENT DOCUMENTS

| | | | |
|---|---|---|---|
| 2,490,621 | A | 12/1949 | Colomer |
| 3,711,976 | A | 1/1973 | Allen |
| 4,030,842 | A | 6/1977 | White et al. |
| 5,176,774 | A | 1/1993 | Laniado et al. |
| 5,906,063 | A | 5/1999 | Magee |
| 5,966,854 | A | 10/1999 | Walsh et al. |
| 6,301,812 | B1 | 10/2001 | Klunk |
| 6,557,280 | B2 | 5/2003 | Seidel |
| 7,866,472 | B2 | 1/2011 | Aylward |
| 8,016,506 | B2 | 9/2011 | Adamberry |
| 8,235,424 | B2 | 8/2012 | Garcia |
| 8,322,058 | B2 | 12/2012 | Mayer et al. |
| 9,061,539 | B1 | 6/2015 | Parkinson et al. |
| 9,156,300 | B2 | 10/2015 | Parkinson et al. |
| 9,545,811 | B2 | 1/2017 | Talbot et al. |
| 2004/0049958 | A1 | 3/2004 | Eisen et al. |
| 2004/0251376 | A1 | 12/2004 | Flis |
| 2004/0258455 | A1 | 12/2004 | Brunetti |
| 2005/0227214 | A1* | 10/2005 | Clegg ................ G11B 33/0488 434/309 |
| 2008/0005942 | A1 | 1/2008 | Harney |
| 2009/0080965 | A1 | 3/2009 | Adamberry |
| 2009/0272832 | A1 | 11/2009 | Gantzer |
| 2010/0162601 | A1* | 7/2010 | Kim ........................ G09F 11/30 40/514 |
| 2013/0305573 | A1 | 11/2013 | Nemeth et al. |
| 2019/0228688 | A1 | 7/2019 | Lacy |

OTHER PUBLICATIONS

Notice of Allowance dated Jul. 8, 2019 in U.S. Appl. No. 15/879,119, 7 pages.
Office Action received for Canadian Patent Application No. 3030818, dated Feb. 20, 2020, 4 pages.
Examination Report received for GB Patent Application No. 1900937.2, dated Mar. 5, 2020, 2 pages.

* cited by examiner

UNFURLING BANNER GREETING CARD AND THE LIKE

CROSS-REFERENCE TO RELATED APPLICATIONS

This application is a continuation-in-part of co-pending U.S. patent application Ser. No. 15/879,119, filed Jan. 24, 2018, and entitled "UNFURLING BANNER GREETING CARD AND THE LIKE," the contents of which is incorporated herein by reference in the entirety.

TECHNICAL FIELD

The present invention relates generally to self-retracting banner extensions. More particularly, the present invention relates generally to self-retracting banner extensions in products that contain two hinged planes that move toward and away from one another, for example greeting cards, books, invitations, boxes, and other objects with flaps.

BACKGROUND

Technology may be added to a greeting card or the like to make a compelling event occur when a consumer interacts with the greeting card or similar object. Historically, card content has been limited to the front, back or inside portions of a card. It is desirable to provide an additional portion to extend the theme of the card beyond the front, back, and inside portions, while maintaining a similar form factor as found in a typical card. The card can include decorative content and expressive content that can be easily viewed by a person holding the card, but difficult for people more than a few feet away to view. It is desirable to create the compelling event anywhere that adds content, especially large content that is viewable at a distance.

SUMMARY

This summary is provided to introduce a selection of concepts in a simplified form that are further described below in the detailed description section. This summary is not intended to identify key features or essential features of the claimed subject matter, nor is it intended to be used as an aid in determining the scope of the claimed subject matter. The scope of the invention is defined by the claims.

The technology described herein relates to a self-retracting banner extension in a consumer product having communicative content. The banner can include content that complements the content on the consumer product. The product can contain two hinged planes that move toward and away from one another, for example, greeting cards, books, invitations, boxes, and other objects with flaps. In one embodiment, embodiments comprise a greeting card with a self-retracting, pullout banner comprising banner content that may supplement a message or artwork included on panels of the greeting card. In one embodiment, a greeting card having an unfurling banner may comprise a panel having at least a first subpanel and a second subpanel. The first subpanel and the second subpanel may be separated by a fold in the panel. In another aspect, a greeting card can take the form of a single panel, similar to a post card.

The banner can be attached to a different portion of the greeting card. The banner may be affixed to an edge of the greeting card. The banner may be attached to the edge of the greeting card at one end and with a handle at an opposite end. A user may extend the banner by pulling the handle away from the greeting card. As such, the banner is movable to and between a fully retracted and closed first position and a fully extended and open second position. The banner remains in the first position until the user pulls the handle and will automatically retract to the first position as the user releases the handle.

In an embodiment, the banner can be concealed within a compartment attached to a portion of the greeting card, for example, the front panel.

The banner can be made of a material that includes polyethylene terephthalate "PET", which provides a "spring-loaded" property. The use of PET allows the banner to move back to the closed position without use of a separate spring loading mechanism in the spool or elsewhere on the card.

In an embodiment, the greeting card may include a sound activation feature that is tied to the banner movement. For example, a sound may be emitted as the banner is pulled from a closed position to an open position. The sound may stop upon the banner reaching its full position.

BRIEF DESCRIPTION OF THE SEVERAL VIEWS OF THE DRAWINGS

The present invention is explained in more detail below with reference to the embodiments illustrated in the attached drawing figures, in which like reference numerals denote like elements, in which FIGS. 1-8 illustrate but four possible embodiments of the present invention, and in which:

FIG. 1 is a front perspective view of a greeting card in an open position, in accordance with an embodiment of the present invention;

FIG. 2 is a front perspective view of the greeting card of FIG. 1, but with the banner transitioning from a closed position to an open position;

FIG. 3 is a front perspective view of the greeting card of FIG. 1, but with the banner in a fully open position;

FIG. 4 is the greeting card of FIG. 1, showing a top view of a cross section of the banner and handle in a closed position;

FIG. 5 is a front perspective view of a greeting card with an unfurling banner partially concealed in a compartment attached to a front panel of the greeting card;

FIG. 6 is a side view of the greeting card of FIG. 5;

FIG. 7 is a front perspective view of the greeting card of FIG. 5, but with the banner transitioning from a closed position to an open position;

FIG. 8 is a front perspective view of the greeting card of FIG. 5, but with the banner in a fully open position;

DETAILED DESCRIPTION

Figure 1:
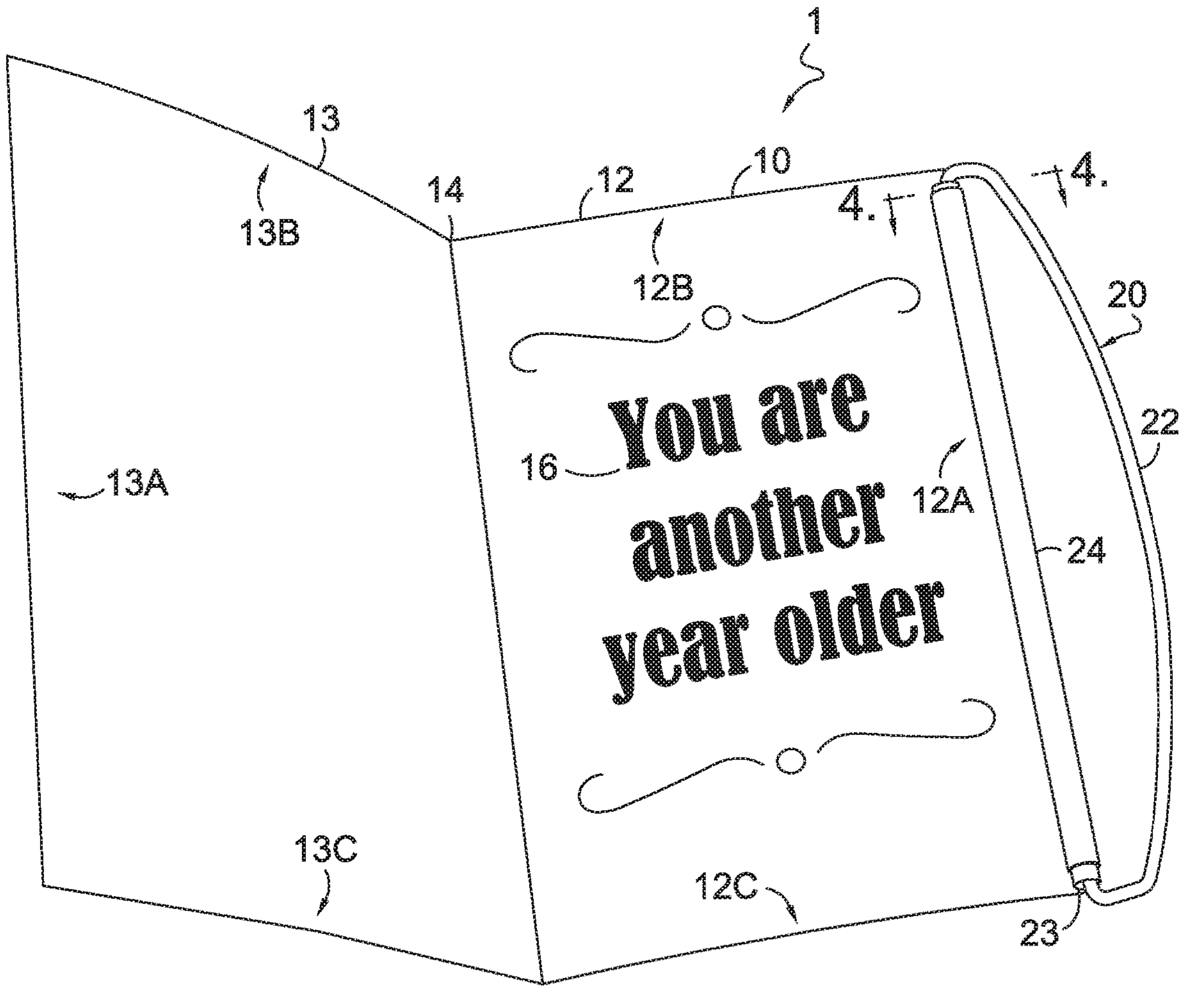

The subject matter of the present invention is described with specificity herein to meet statutory requirements. However, the description itself is not intended to limit the scope of this patent. Rather, the inventors have contemplated that the claimed subject matter might also be embodied in other ways, to include different steps or a combination of steps similar to the ones described in this document, in conjunction with other present or future technologies.

The technology described herein relates to a self-retracting banner extension in a consumer product having communicative content. The banner can include content that complements the content on the consumer product. The product can contain two hinged planes that move toward and away from one another, for example, greeting cards, books, invitations, boxes, and other objects with flaps. In one embodiment, embodiments comprise a greeting card with a self-retracting, pullout banner comprising banner content that may supplement a message or artwork included on panels of the greeting card. In one embodiment, a greeting card having an unfurling banner may comprise a panel having at least a first subpanel and a second subpanel. The first subpanel and the second subpanel may be separated by a fold in the panel. In another aspect, a greeting card can take the form of a single panel, similar to a post card.

The self-retracting banner can be attached to different portion of the greeting card. The self-retracting banner may be affixed to an edge of the greeting card. The banner may be attached to the edge of the greeting card at one end and with a handle at an opposite end. A user may extend the banner by pulling the handle away from the greeting card. As such, the self-retracting banner is movable to and between a fully retracted and closed first position and a fully extended and open second position. The self-retracting banner remains in the first position until the user pulls the handle and will automatically retract to the first position as the user releases the handle.

In an embodiment, the self-retracting banner can be concealed within a compartment attached to a portion of the greeting card, for example, the front panel.

The self-retracting banner can be made of a material that includes polyethylene terephthalate "PET", which provides a "spring-loaded" property. The use of PET allows the self-retracting banner to move back to the closed position without use of a separate spring loading mechanism in the spool or elsewhere on the card.

In an embodiment, the greeting card may include a sound activation feature that is tied to the banner movement. For example, a sound may be emitted as the banner is pulled from a closed position to an open position. The sound may stop upon the banner reaching its full position.

Referring now to the drawings in more detail, wherein like reference characters designate like parts throughout the different views, and initially to FIGS. 1-7, a greeting card 1 having a self-retracting banner apparatus 20 is depicted, in accordance with a first embodiment of the present invention. The greeting card 1 includes a panel 10, a self-retracting banner apparatus 20 coupled to the panel 10, and a decorative card content 16. In some embodiments, the greeting card 1 may further include a cover (not shown).

The panel 10 may include two or more subpanels and at least one fold. For example, the panel 10 may include a first subpanel 12 and a second subpanel 13 separated from one another by a first fold 14. Some embodiments of the panel 10 may include additional subpanels. The first subpanel 12 can include an interior-facing side and an exterior-facing side (not visible). Both the interior and exterior facing sides can include decorative card content, including artwork and writing. The second subpanel 13 can likewise include an interior-facing side and an exterior-facing side (not visible). Both the interior and exterior facing sides can include decorative card content, including artwork and writing. The interior facing sides are only visible when the card is in an unfolded position. The exterior facing sides may be visible in either the folded or the unfolded position, depending on card orientation.

Each of the greeting card 1 and the panel 10 may have a folded position and an unfolded position. In some embodiments, the unfolded position of the greeting card 1 (shown in FIG. 1) may correspond to the unfolded position of the panel 10 (shown in FIG. 1). The folded position of the greeting card 1 may have an interior portion and an exterior portion. The interior portion of the greeting card 1 may be obscured from view when the greeting card 1 is in the folded position (i.e., closed) and may be exposed when the greeting card 1 is in the unfolded position (i.e., open).

The panel 10 may include one or more windows for viewing (not shown) the interior portion of the greeting card 1 when the greeting card 1 is in the folded position. For example, the second subpanel 13 may include a window through which an interior portion of the greeting card 1 (such as part of the decorative card content 16) may be viewed.

The decorative card content 16 may be affixed to the panel 10. For example, the decorative card content 16 may be affixed to the first subpanel 12. In one embodiment, the decorative card content 16 is printed onto the panel 10.

The greeting card 1 includes a self-retracting banner apparatus 20 attached to a right-vertical edge 12A of the first subpanel 12. The top-horizontal edge 12B of the first subpanel 12 and the bottom-horizontal edge 12C of the first subpanel 12 are alternative attachment locations that may be used in some embodiments. In one embodiment (not shown), a self-retracting banner is attached to more than one edge of the greeting card 1. For example, a self-retracting banner could also be attached to the left-vertical edge 13A of the second subpanel 13. The top-horizontal edge 13B of the second subpanel 13 and the bottom-horizontal edge 13C of the second subpanel 13 are alternative attachment locations that may be used in some embodiments.

Figure 2:
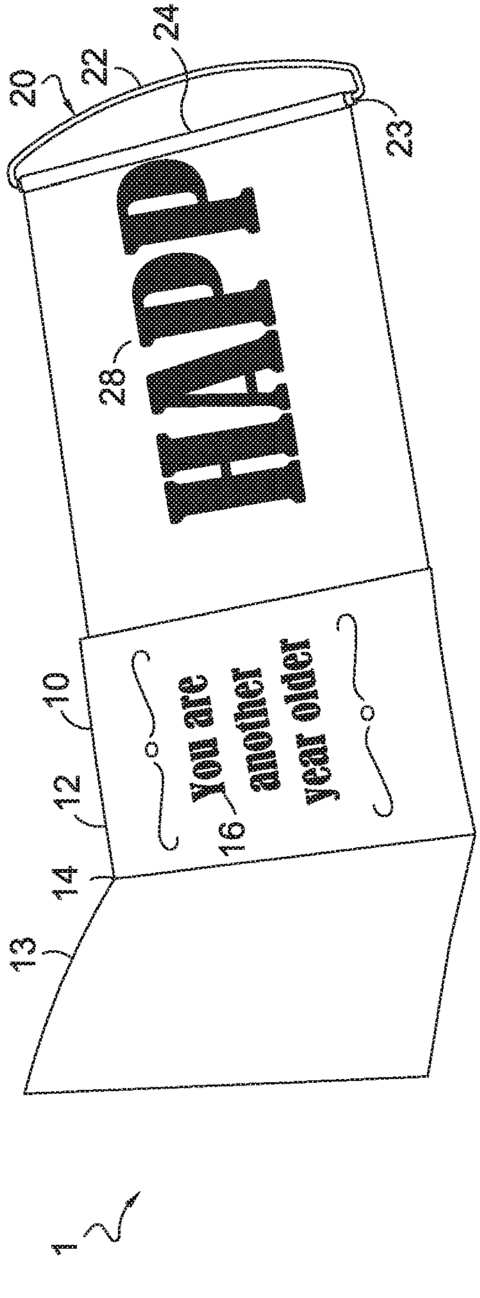
Figure 3:
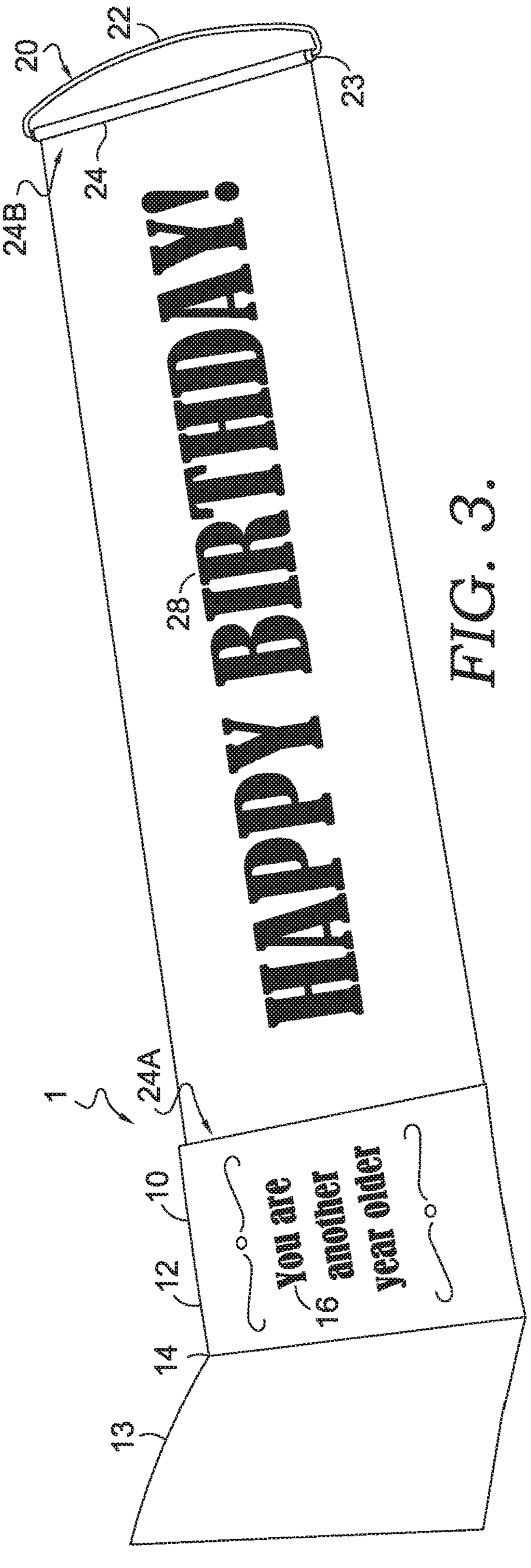

The self-retracting banner apparatus 20 comprises a handle 22, an unfurling banner 24, and a spool 23. A user may extend the unfurling banner 24 by pulling the handle 22 away from the greeting card 1. As such, the unfurling banner 24 is movable to and between a fully retracted (as shown in FIG. 1) and closed first position (as shown in FIG. 1) and a fully extended and open, second position (as shown in FIG. 3). The unfurling banner 24 remains in the first position until the user pulls the handle and will automatically retract to the first position as the user releases the handle. FIG. 2 shows the unfurling banner 24 in a mid-extension position.

The unfurling banner 24 includes content 28 that complements the decorative card content 16 on the greeting card 1. The content reads, "Happy Birthday!", which complements the decorative card content 16, which reads, "You are another year older." As can be seen, the unfurling banner 24 is about the same height as the card 1, but is several times longer. In one embodiment, the unfurling banner 24 is at least twice as long as the greeting card 1 is wide. For example, the unfurling banner 24 can have a length that is 2.5 times the card width, 3 times the card width, 3.5 times the card width, 4 times the card width, 5 times the card width, or longer.

The font size on the unfurling banner 24 can also be several times larger than the font size used on the decorative portion 16. In one embodiment, the font size on the unfurling banner 24 is at least twice as large as the font size on the decorative portion 16. For example, the unfurling banner 24 can have a font size that is 2.5 times the font size on the decorative card content 16, 3 times the font size on the decorative card content 16, 3.5 times the font size on the decorative card content 16, 4 times the font size on the decorative card content 16, 5 times the font size on the decorative card content 16, or longer.

The card content and banner content can be related. For example, the banner content and card content in combination can complete a single message. For example, the banner content and the card content can form a single phrase or sentence when combined. In another embodiment, the banner content can answer a question posed by the card content. The card content and banner content can use the same decorative themes, such as the same text colors and fonts. The background color can be used on both the card and the unfurling banner 24. The handle 22 can also be the same color as the unfurling banner 24.

The banner can be made of a material that includes Polyethylene Terephthalate "PET", which provides a "spring-loaded" property. In other words, the banner can return to its original spooled configuration once the force holding it in the open position is removed. The use of PET allows the banner to move back to the closed position without use of a separate spring loading mechanism in the spool or elsewhere on the card. In other words, the unfurling banner 24 can transition from open to closed automatically when the user removes his hand from the banner.

Figure 4:
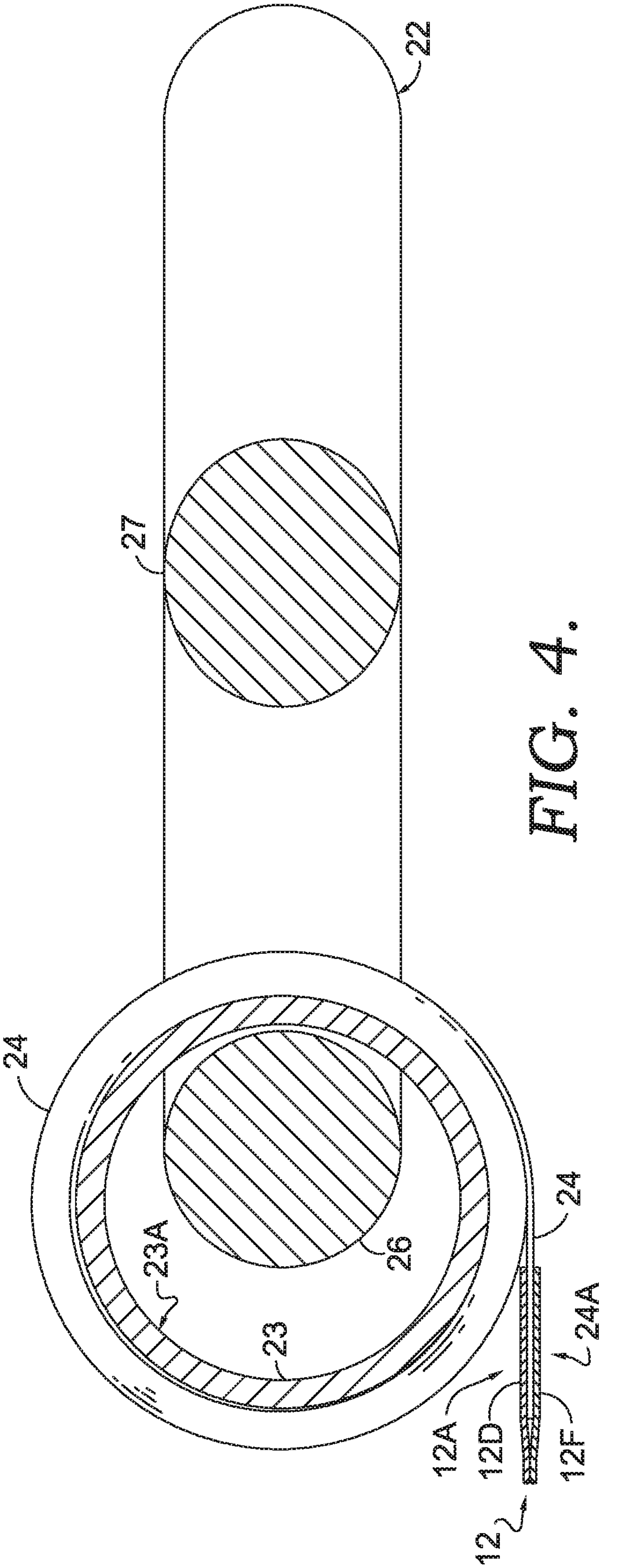

Turning now to FIG. 4, a cross-section of the self-retracting banner apparatus 20 is shown. The unfurling banner 24 is attached between a first ply 12D and a second ply 12F of the first subpanel 12 at the right-vertical edge 12A. A second end 24A of the unfurling banner 24 may be attached to the first ply 12D and the second ply 12F using an adhesive between the unfurling banner 24 and the first ply 12D and between the unfurling banner 24 and the second 12F. The opposite end of the banner, a first end 24B of the unfurling banner (as shown if FIG. 3), can be attached to the spool 23. The spool 23 can be formed from a suitable plastic, fiberglass, metal, or some other suitable material. An end of the unfurling banner 24, such as the first end 24B (as shown in FIG. 3), can be adhered to the spool, threaded through a slot in the spool, or otherwise attached to the spool to keep the spool and unfurling banner 24 coupled.

The handle 22 can loop outward from the spool 23 to allow room for a hand to fit between the handle 22 and the spool 23. As cross-section 27 shows, the handle 22 can be substantially cylindrical. The handle 22 includes a spool rod 26 that passes through at least a portion of the spool's inner circumference 23A. In one embodiment, the handle 22 can be bent to allow the ends of the spool rod 26 to be inserted into the inner circumference of the spool 23. The ends of the spool rod 26 can penetrate the inner circumference volume of the spool 23 a sufficient distance that the spool 23 is not easily removed from the spool rod 26. In an embodiment, the self-retracting banner apparatus 20 does not include a spring-loaded mechanism to power a self-retracting function.

Figure 5:
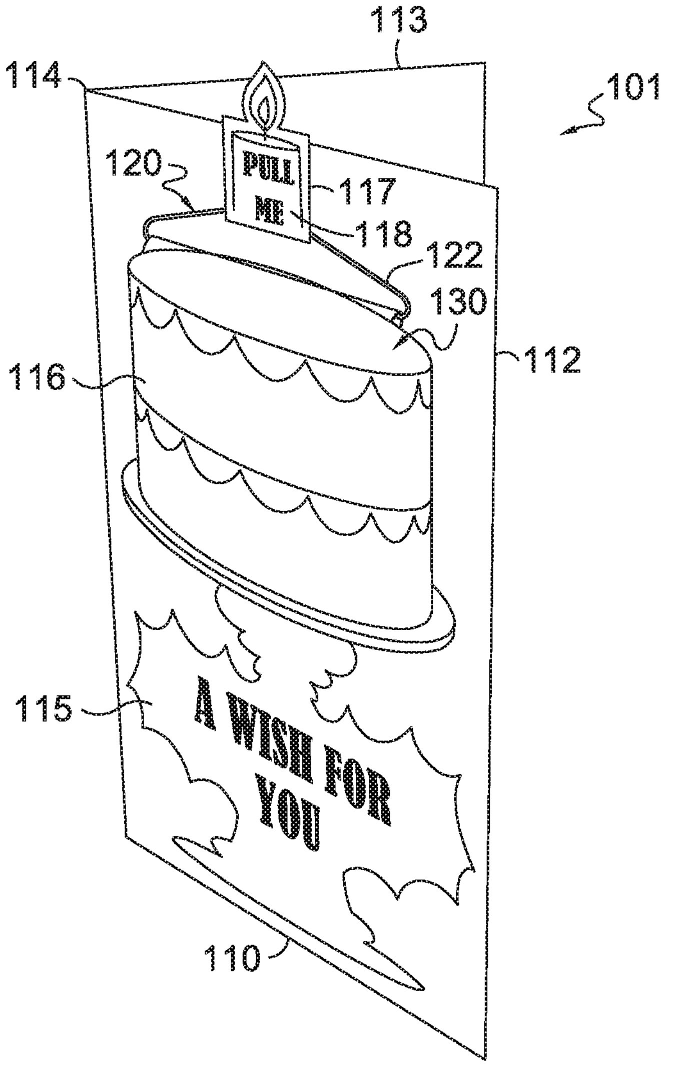

Turning to FIG. 5, the greeting card 101 may include many of the same features as the greeting card 1 (discussed above in reference to FIGS. 1-4). For example, the greeting card 101 may include a panel 110 having multiple subpanels each separated by a fold. Referring to FIG. 5, the panel 110 includes a first subpanel 112 and a second subpanel 113 separated by a fold 114.

The self-retracting banner apparatus 120 is partially concealed by a front portion 116 of container 130. The container 130 is attached to the exterior-facing side of the first subpanel 112. This is just one example of a suitable attachment point for a container that conceals, or partially conceals, the self-retracting banner apparatus 120. The handle 122 includes a tab 117 with a "pull me" message 118 providing instruction for the user to follow. The front portion 116 of the container 130 has the appearance of a birthday cake, which complements the decorative card content 115 on the card 101.

Figure 6:
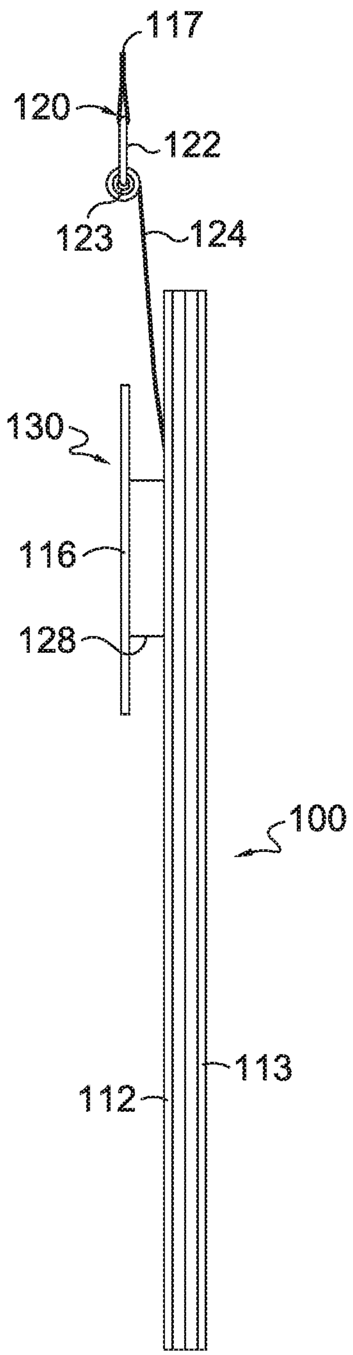

FIG. 6 shows a side view of the card and more details of the self-retracting banner apparatus 120, which is partially transitioned from the closed position (shown in FIG. 4) to an open position. The front portion 116 of the container 130 is attached to the exterior of the first subpanel 112 by a connector 128. Though not shown, one or more other connectors can be located in parallel with the connector 128. The vertical connector can be shaped as a flat bar, a C-shaped channel, an I-Beam or other suitable shape adapted to couple the front portion 116 to the first subpanel 112. The connector is shown in a vertical alignment, but a horizontal connector could be used in combination. The width of the connector 128 can be sufficient to allow the self-retracting banner apparatus 120 to be located entirely or partially between the front portion 116 and the first subpanel 112. The size of the connector 128 may also leave room for movement of the self-retracting banner 120.

One end of the unfurling banner 124 is coupled to the exterior-facing side of the first subpanel 112. The coupling may be made by an adhesive or some other means. The self-retracting banner apparatus 120 can take a form similar to the form described previously with reference to FIG. 4. The self-retracting banner apparatus 120 includes a handle 122 that is coupled to the spool 123 in a manner that allows the spool to rotate freely. The unfurling banner 124 wraps around the spool 123 while in the closed position.

Figure 7:
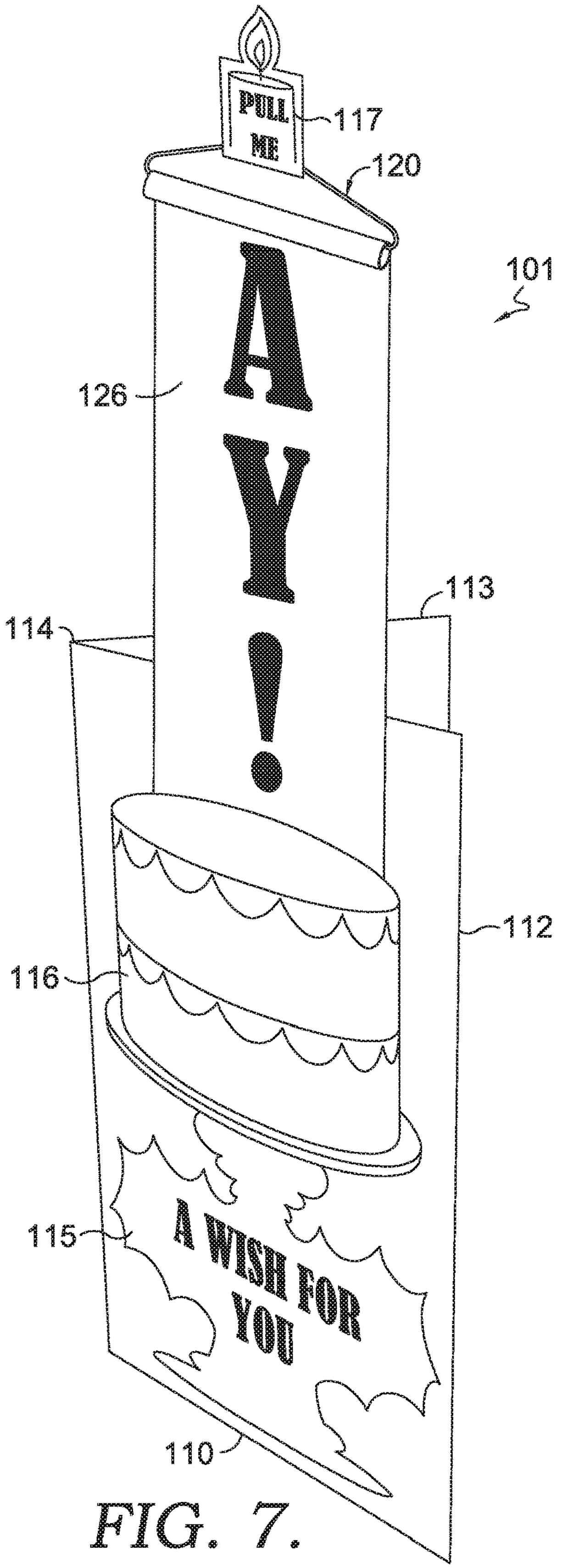
Figure 8:
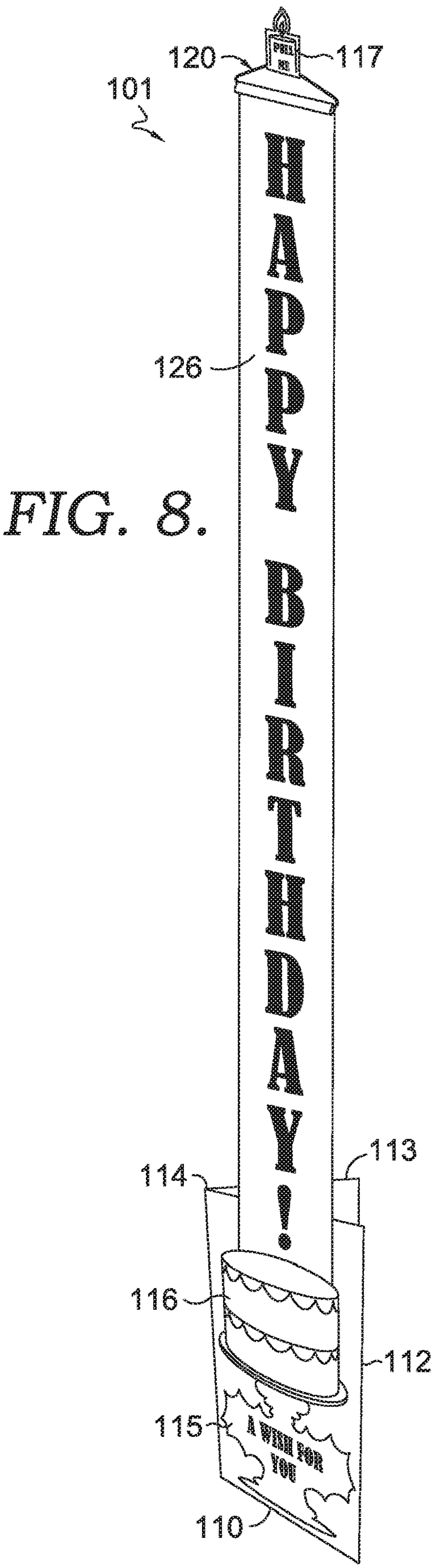

FIG. 7 shows the self-retracting banner apparatus 120 in mid transition between a closed position and an open position. FIG. 8 shows the self-retracting banner apparatus 120 in a fully open position. As can be seen, the banner content 126 comprises a "happy birthday" message, which complements and is a continuation of the card content 115. The font size used for the banner content 126 is larger than the font size used to print the card content 115. The font size used for the decorative card content 126 is large enough to be easily read from across a room, for example, from 20, 30, or even 40 feet away.

As mentioned above, some embodiments of the greeting card may include a sound activation feature that is tied to a movement of the unfurling banner. Such a feature, as well as others, can be implemented by incorporating an electronic component into the greeting card that is configured to generate an output when the unfurling banner is unrolled/moved out of a closed position. Generally, the electronic component includes multiple electrical components that cooperate with one another to provide a sound activation feature in the greeting card.

Figure 9:
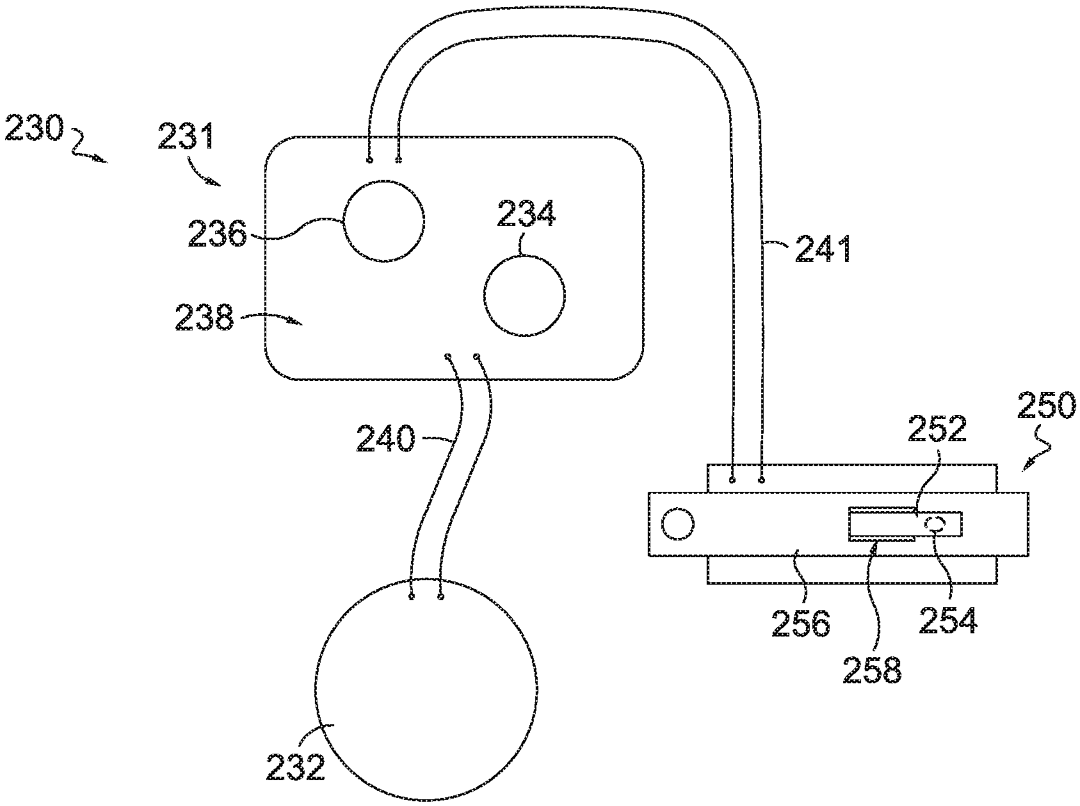
FIG. 9 is a view of electronic components that can be incorporated into a greeting card to provide a sound activation feature tied to a movement of an unfurling banner.

FIG. 9 depicts an example of an electronic component 230 that may be included in the greeting card to implement various activation features tied to a movement of the unfurling banner. The electronic component 230 may comprise an electronic module 231 (e.g., an audio module, sound module, or audio playback device) and a switch 250. At a high level, the electronic module 231 may be configured to store one or more activation files (e.g., a light sequence or audio file such as a sound effect, musical recording, voice recording, audio message, and the like) and may further be configured to generate an output (e.g., sequential flashing of a light or playing of an audio file by a speaker) associated with the one or more activation files when activated by the switch 250.

Additional electrical components may also be included in the electronic component 230, which may partly depend on an activation feature afforded to the greeting card by the electronic component 230. Other electrical components that may be included in the electronic component 230 include an output component 232 (e.g., a light or speaker), a power component 234 (e.g., batteries), and a processor component 236 (e.g., an integrated circuit, chip, or processor chip), any of which may be placed on a printed a circuit board 238 and/or electrically connected by wires 240. In the example of FIG. 9, the electronic module 231 is depicted with the power component 234 and the processor component 236 included on the circuit board 238 and with the output component 232 electrically connected by the wires 240.

Continuing with FIG. 9, the switch 250 is electrically connected to the electronic module 231 by wires 241 and is configured to activate the electronic module 231. The switch 250 is a contact slider switch that includes a trigger 252, a contact point 254 (shown as dashed lines), and a slider 256. The trigger 252 and the contact point 254 are configured such that contact between the two forms an electrical connection (i.e., closed electrical circuit) that activates the switch 250 and in turn, initiates an activation of the electronic module 231. The slider 256 is configured to be moveable in a manner to selectively permit and prevent contact between the trigger 252 and the contact point 254, thereby permitting and preventing an electrical connection. As such, the slider 256 is operably connected to the trigger 252 and the contact point 254, and in this way, the switch 250 is operable to activate the electronic module 231.

By way of example, in an active position (shown in FIG. 11), the slider 256 permits contact between the trigger 252 and the contact point 254, and in an inactive position (shown in FIGS. 9 and 10), the slider 256 prevents contact between the trigger 252 and the contact point 254. As such, when the slider 256 is in the active position, an electrical connection is formed (i.e., closed an electrical circuit), and the switch 250 is activated, which, in turn, initiates activation of the electronic module 231, thereby generating an output. Conversely, no electrical connection is formed (i.e., opened electrical circuit) when the slider 256 is in the inactive position, and the switch 250 is inactive, which does not initiate activation of the electronic module 231. As a result, no output is generated.

Figure 10:
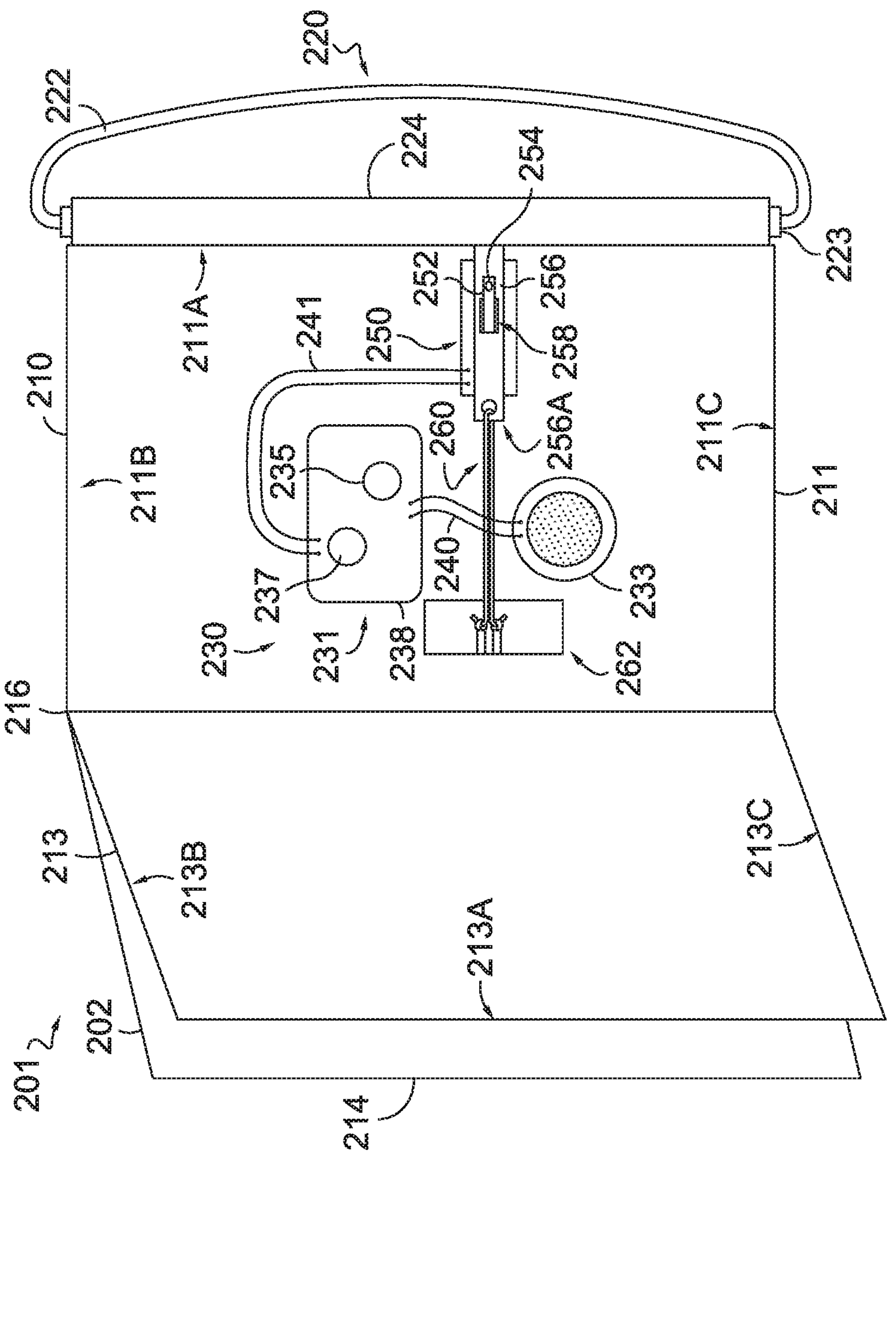
FIG. 10 is a front perspective view of a greeting card with a sound activation feature tied to a movement of an unfurling banner and a subpanel unfolded revealing the electronic components.
Figure 11:
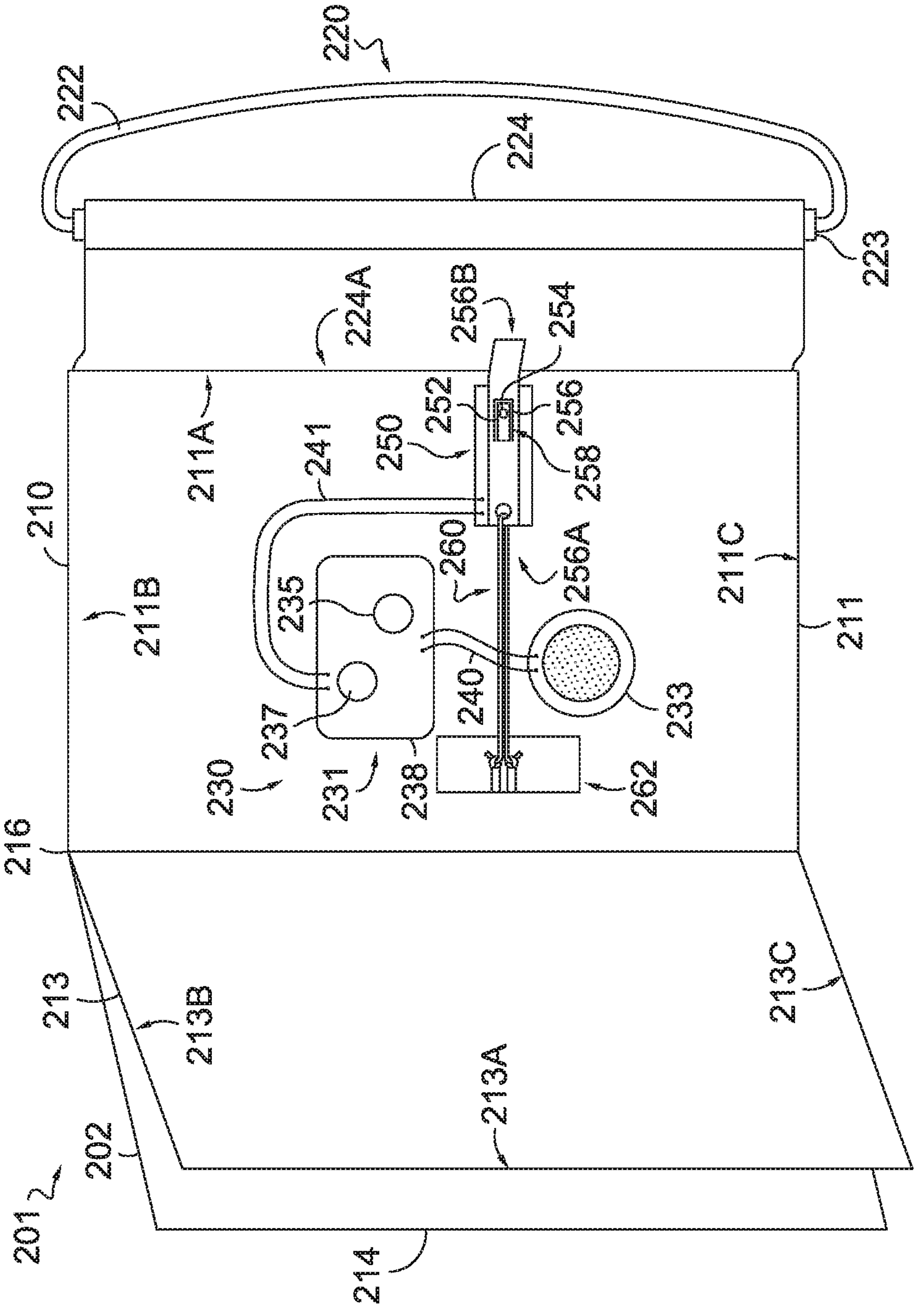
FIG. 11 is a front perspective view of the greeting card of FIG. 10, but with the banner transitioning from a closed position to an open position.

FIGS. 10-13 show front perspective views of a greeting card 201 with a sound activation feature tied to a movement of an unfurling banner in accordance with an embodiment of the present invention. FIGS. 10 and 11 depict the greeting card 201 in a partially deconstructed state with a subpanel unfolded to show aspects related to an incorporated electronic component 230, and in FIGS. 12 and 13, the greeting card 201 is depicted in a constructed state. The greeting card 201 may include many of the same and/or similar features as the greeting cards 1, 101 (discussed above in reference to FIGS. 1-8) but also includes additional features, some of which relate to an incorporation of the electronic component 230.

Referring to FIGS. 10-13, the greeting card 201 includes a panel 210 that has features similar to the panels 10, 110 (e.g., first subpanels 12, 112, second subpanels 13, 113, and first folds 14, 114). The panel 210 includes a first subpanel 211 (shown in FIGS. 10 and 11) and a second subpanel 212 (shown in FIG. 12) separated from one another by a first fold 215, all of which have the same orientation and arrangement in the greeting card 201 as the first and second subpanels 12, 13 and the first fold 14 in the greeting card 1. Thus, the first and second subpanels 211, 212 respectively include edges (e.g., edges 211A, 211B, 211C of the first subpanel 211 and edges 212A, 212B, 212C of the second subpanel 212) that are located in the greeting card 201 in the same way as the edges of the first subpanel 12 (e.g., edges 12A, 12B, 12C) and second subpanel 13 (e.g., edges 13A, 13B, 13C) in the greeting card 1.

The greeting card 201 includes a self-retracting banner apparatus 220 that has the same features and operates in the same manner as the self-retracting banner apparatus 20 of the greeting card 1 (discussed above in reference to FIGS. 1-4). The self-retracting banner apparatus 220 comprises a handle 222, a spool 223, and an unfurling banner 224, and the self-retracting banner apparatus 220 is attached to the right-vertical edge 211A of the first subpanel 211 in the same manner as the self-retracting banner apparatus 20 is attached to the right-vertical edge 12A of the first subpanel 12 (discussed above in reference to FIG. 4). In other embodiments (not shown), the self-retracting banner apparatus 220 can be attached to a different edge and/or more than one edge of the greeting card 201, and in another embodiment (not shown), the self-retracting banner apparatus 220 can take a form similar to the self-retracting banner apparatus 120 and can be included in the greeting card 201 in a manner similar to the greeting card 101 (discussed above in reference to FIGS. 4-8).

The greeting card 201 may also include an interior panel 202 that is overlaid with the panel 210. The interior panel 202 has features that are similar to and correspond with those of the panel 210. Thus, the interior panel 202 includes a third subpanel 213 (shown in FIGS. 10-13) and a fourth subpanel 214 (best shown in FIG. 13) separated from one another by a second fold 216 (best shown in FIG. 13). The first and third subpanels 211, 213, the second and fourth subpanels 212, 214, and the first and second folds 215, 216 are respectively overlaid one another in the greeting card 201. Moreover, the third subpanel 213 includes edges (e.g., edges 213A, 213B, 213C) that are similar to and correspond with a respective edge of the first subpanel 211 (e.g., 211A, 211B, 211C), and the fourth subpanel 214 includes edges (e.g., edges 214A, 214B, 214C) that are similar to and correspond with a respective edge of the second subpanel (e.g., edges 212A, 212B, 212C). Further, each of the corresponding edges (e.g., edge 211A of the first subpanel 211 and edge 213A of the third subpanel 213) are aligned with one another in the greeting card 201.

Continuing, the interior panel 202 and the panel 210 have generally equal dimensions (e.g., height, width, length, area, etc.) and collectively form the greeting card 201. As used herein, the term "generally" means within at least 10% of a given value. The interior panel 202 and the panel 210 are arranged in the greeting card 201 such that the interior panel 202 forms an interior portion (shown in FIG. 13) and the panel 210 forms an exterior portion (partially shown in FIG. 12). Moreover, the interior panel 202 and the panel 210 are attached such that an interior compartment capable of housing electrical components of the electronic component 230 is formed in the greeting card 201. The interior panel 202 and the panel 210 are glued to one another along their respective edges but may be affixed in a different manner and/or by any means known in the art (e.g., an adhesive, bonding, agent, tape, etc.).

In another other embodiment (not shown), the interior panel 202 can include a single subpanel with the same features as the third and fourth subpanels 213, 214 that can be affixed to and positioned overtop one or more subpanels of the panel 210 in a manner that forms an interior compartment in the greeting card. For instance, the interior panel 202 can include a single subpanel affixed to the panel 210 proximate the first fold 215 and along the edges 211A, 211B, 211C of the first subpanel 211 and positioned overtop the first subpanel 211 to form an interior compartment in the greeting card.

Though not shown, the panel 210 can include one or more additional subpanels in place of or in addition to the interior panel 202. In such embodiments, the panel 210 can include one additional subpanel that can be folded and/or positioned overtop another subpanel and affixed to the panel 210 to form an interior compartment in the greeting card that houses and conceals electrical components of the electronic component. The one additional subpanel can be included in the panel 210 such that the one additional subpanel is joined to one or more edges of the first or second subpanels 211, 212 and a fold is formed along the one or more edges to which the one additional subpanel is joined. For example, the one additional panel can be joined to the top-horizontal edge 211B of the first subpanel 211, which forms a fold in the panel 210 along the top-horizontal edge 211B. Continuing with this example, the one additional subpanel can be folded downward at the fold formed along the top-horizontal edge 211B such that the one additional subpanel is positioned overtop and in alignment with the first subpanel 211 to form an interior compartment in the greeting card.

In additional embodiments (not shown), the panel 210 can include two or more additional subpanels, each of which can folded and/or positioned overtop a different subpanel and affixed to the panel 210 to individually or collectively form an interior compartment in the greeting card that houses and conceals electrical components of the electronic component. Each of the two or more additional subpanels can be included in the panel 210 in a manner like the one additional subpanel, as discussed in the preceding paragraph. Moreover, the two or more additional panels can be separated from one another by a fold and/or can be included in the panel 210 such that only one of the two or more additional panels is joined to one or more edges of the first and second subpanels 211, 212. In one example, where the panel 210 includes two additional subpanels, one additional subpanel can be joined to the left-vertical edge 212A of the second subpanel 212, forming a fold in the panel 210. Continuing, the one additional subpanel can be folded rightward at the fold such that the one additional subpanel is positioned overtop the second subpanel 212, a fold separating the two additional subpanels is aligned overtop the first fold 215, and the other additional subpanel is positioned overtop the first subpanel 211 to form an interior compartment in the greeting card.

Figure 12:
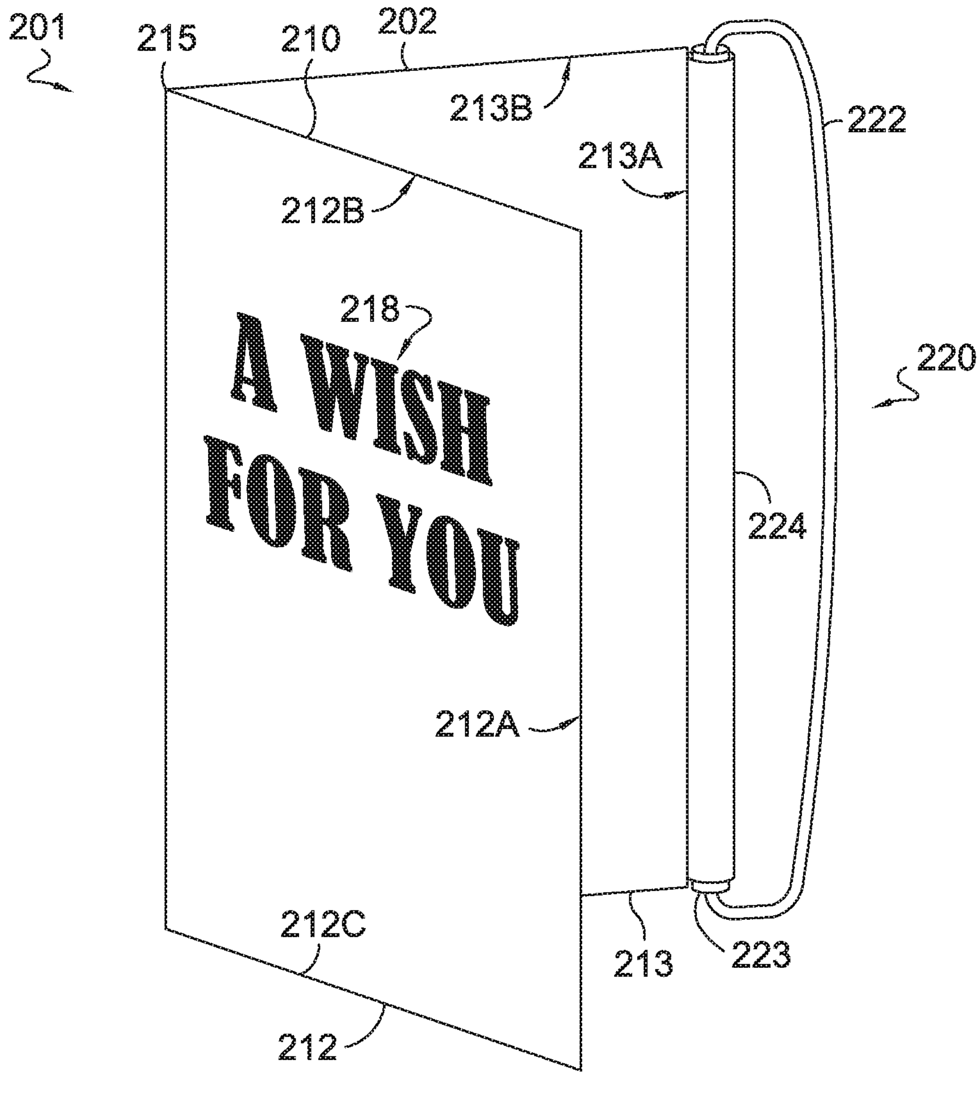
FIG. 12 is a front perspective view of the greeting card of FIG. 10 in a constructed state and a closed position with the banner in a closed position.
Figure 13:
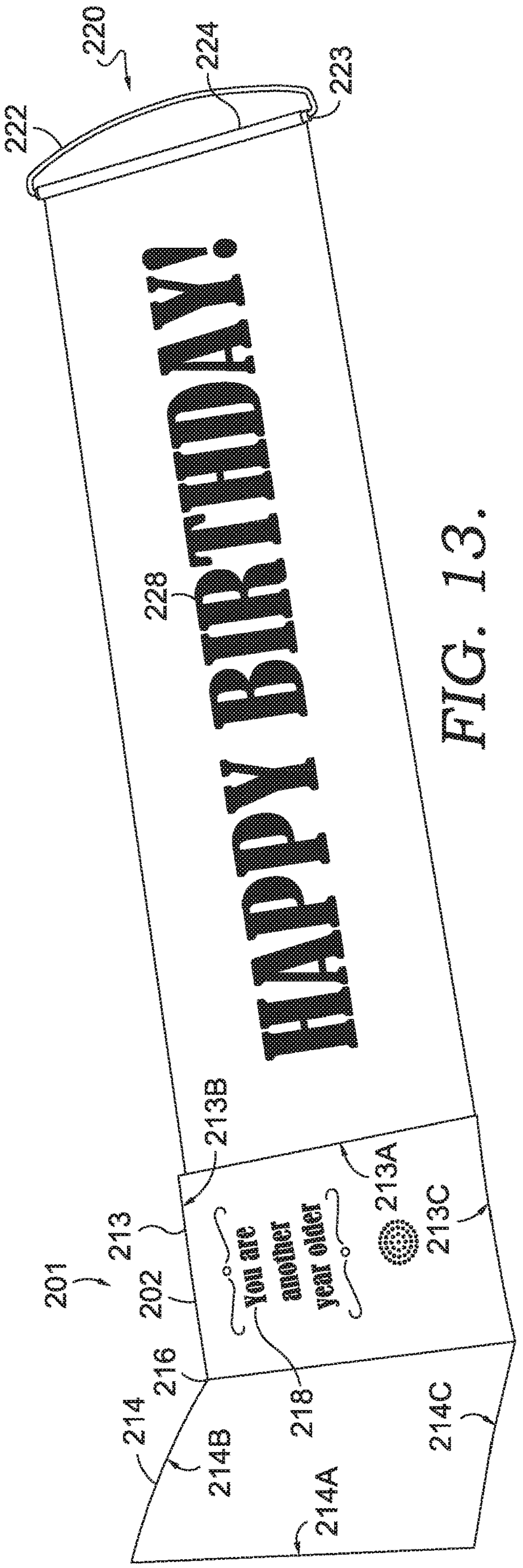
FIG. 13 is a front perspective view of the greeting card of FIG. 12 in a constructed state and an open position, but with the banner in a fully open position.

Turning to aspects related to a sound activation feature, generally, the electronic component 230 is positioned interiorly in the greeting card 201 (e.g., between the interior panel 202 and the panel 210) such that the electronic component 230 is hidden from view (as shown in FIG. 13) when the greeting card 201 is in a constructed state (shown in FIGS. 12 and 13). In the greeting card 201, the electronic component 230 includes electrical components (as discussed above in reference to FIG. 9) that are configured to afford a sound activation feature tied to a movement of the unfurling banner 224.

With reference to FIGS. 10 and 11, the electronic component 230 comprises the electronic module 231, a speaker 233 (i.e., an output component), a battery 235 (i.e., a power component), a processor chip 237 (i.e., a processor component), the circuit board 238, and the switch 250. The electronic module 231, the speaker 233, and the switch 250 are glued to an interior side of the first subpanel 211 but may be affixed by any means known in the art (e.g., an adhesive, bonding, agent, tape, etc.). The electronic module 231 is electrically connected to the battery 235 and the processor chip 237 via the circuit board 238 and is electrically connected to each of the speaker 233 and the switch 250 by the wires 240, 241, respectively. In this embodiment, the electronic module 231 is configured to store an audio file and to play the stored audio file over the speaker 233 upon activation by the switch 250.

The switch 250 comprises the trigger 252, the contact point 254, and the slider 256 and is configured to initiate activation of the electronic module 231 when an electrical connection is formed (i.e., a closed electrical circuit) by contact between the trigger 252 and the contact point 254. The switch 250 is attached to the first subpanel 211 near the right-vertical edge 211A and approximately halfway between the top-horizontal and bottom-horizontal edges 211B, 211C. Moreover, the switch 250 is oriented such that a movement of the slider 256 from the inactive position to the active position is in a same lateral direction as a movement that unrolls/moves the unfurling banner 224 out of a closed position.

The slider 256 comprises a first slider end 256A, a second slider end 256B opposite the first slider end 256A, and an aperture 258. The slider 256 is moveable to permit and prevent contact between the trigger 252 and the contact point 254. As discussed above in reference to FIG. 9, in the active position, the slider 256 permits contact between the trigger 252 and the contact point 254, and in the inactive position, the slider 256 prevents contact between the trigger 252 and the contact point 254. At the first slider end 256A, the slider 256 is attached to a connecting band 260, and at the second slider end 256B, the slider 256 is attached to the unfurling banner 224 (best shown in FIG. 11).

As shown in FIG. 11, the second slider end 256B is attached near a second end 224A of the unfurling banner 224 at a location that positions the slider 256 in the active position when the unfurling banner 224 is unrolled and/or moved out of a closed position. The second slider end 256B and the unfurling banner 224 are affixed by glue but may be affixed by any means known in the art (e.g., an adhesive bonding agent, etc.).

In FIGS. 10 and 11, the first slider end 256A and the connecting band 260 are attached by looping the connecting band 260 through a hole (not identified) in the slider 256 proximate the first slider end 256A. Although not depicted, the first slider end 256A and the connecting band 260 may be attached by any means known in the art (e.g., an adhesive, glue, bonding, agent, tape, etc.). In one embodiment (not shown), the connecting band 260 may be integrated as part of the slider 256 and included as an elongated portion extending from the first slider end 256A.

Continuing, the connecting band 260 is affixed to an attachment tab 262 on an interior side of the first subpanel 211 by glue but may be affixed using any means known in the art (e.g., an adhesive, bonding, agent, tape, etc.). The attachment tab 262 is positioned near the first fold 215 in the panel 210 and is positioned such that an attachment between the connecting band 260 and the attachment tab 262 is located opposite an attachment between the connecting band 260 and the first slider end 256A. Moreover, the connecting band 260 is in horizontal alignment with both the slider 256 and an attachment between the second slider end 256B and the unfurling banner 224.

The connecting band 260 can be made of a material that includes rubber or an elastomer, which provides an elastic property and allows the connecting band 260 to return to an original shape after being stretched. Thus, in conjunction with an attachment to the attachment tab 262, the connecting band 260 positions the slider 256 in the inactive position when the unfurling banner 224 is in a closed position (as shown in FIGS. 10 and 12). Moreover, the connecting band 260 includes an elastic property sufficient for the connecting band 260 to return to an original shape and to move the slider 256 into the inactive position when the unfurling banner 224 is in a closed position. At the same time, the elastic property is insufficient for the connecting band 260 to maintain an original shape and to hold the slider 256 in the inactive position when the unfurling banner 224 is unrolled and/or moved out of a closed position.

The connecting band 260 and an unrolling and/or movement of the unfurling banner 224 out of a closed position cooperate to move the slider 256 to and between the inactive position (as shown in FIG. 10) and the active position (as shown in FIG. 11). In FIG. 10, which depicts the unfurling banner 224 in a closed position, the elastic property of the connecting band 260 is sufficient to move the slider 256 into the inactive position. As can be seen, the aperture 258 is offset from the contact point 254 (shown as dashed lines), and the slider 256 is positioned between a portion of the trigger 252 that is directly above the contact point 254. Thus, contact between the trigger 252 and the contact point 254 is blocked/prevented by the slider 256. As such, an electrical connection is not formed (i.e., open electrical circuit) by the trigger 252 and the contact point 254, and the switch 250 does not activate the electronic module 231 and no output is generated.

FIG. 11 depicts the unfurling banner 224 in mid-transition between a closed position and an open position, and as shown, a force from an unrolling and/or movement of the unfurling banner 224 is sufficient to move the slider 256 to the active position. Moreover, the connecting band 260 is stretched as the elastic property is insufficient to hold the slider 256 in the inactive position when the unfurling banner 224 is unrolled and/or moved out the closed position. Further, the aperture 258 is aligned with the contact point 254 (shown as dashed lines), and thus, the slider 256 permits the trigger 252 to contact the contact point 254 through the aperture 258. Therefore, an electrical connection is formed (i.e., closed electrical circuit) by way of contact between the trigger 252 and the contact point 254 through the aperture 258, and the switch 250 is activated, which, in turn, initiates activation of the electronic module 231.

Taken further, when activated, the electronic module 231 generates an output of a stored audio file (e.g., a playback or playing of the stored audio file by the speaker 233). The stored audio file can include an audio message, sound effect, music, or any combination thereof, which can complement a card content 218 of the greeting card 201 (best shown in FIGS. 12 and 13) and/or a banner content 228 of the unfurling banner 224 (best shown in FIG. 13). In one example, when the card content 218 and the banner content 228 relate to a happy birthday theme, the stored audio file can be an audio message of "happy birthday" that is played by the speaker 233 when a user pulls the handle 222 in a manner that unrolls/move the unfurling banner 224 out of a closed position.

FIGS. 12 and 13 depict the greeting card 201 in a constructed stated. FIG. 12 shows the greeting card 201 in a folded position (i.e., closed) and the unfurling banner 224 in fully retracted closed position, whereas FIG. 13 shows the greeting card 201 in an unfolded position (i.e., open) and the unfurling banner 224 in a fully extended open second position. As can be seen, the greeting card 201 includes the card content 218, which can have the same features or combinations thereof and be attached to the greeting card 201 in the same manner as the decorative card content 16, 115 of the greeting cards 1, 101. Similarly, the unfurling banner 224 includes the banner content 228, which can include the same features or combinations thereof and can be attached to the unfurling banner 224 in the same manner as the content 28, 126 of the greeting cards 1, 101.

In some aspects, the card content 218 and the banner content 228 can be related to one another and can be related to an audio file stored by the electronic module 231. For example, the card content, the banner content, and an output of the stored audio file in combination can complete a single message or form a single phrase or sentence when combined. In other aspects, an output of the stored audio file can answer a question posed by the card content and/or the banner content. Thus, aspects herein contemplate that the content card content, the banner content, and the stored audio file can involve the same themes, such as a holiday theme, a happy birthday theme, a get well theme, and the like.

In additional embodiments, the electronic component 230 can include more than one of the switch 250, each of which can initiate activation of the electronic module 231 in a manner that generates respective outputs that are associated with different activation files. In other embodiments, the switch 250 may be a different type of switch than a contact slider switch. One embodiment can include a switch that is integrated with the electronic module 231 such that the switch 250 is placed on the circuit board 238.

In other embodiments, the switch 250 can initiate activation of the electronic module 231 in a manner that generates two or more outputs that are each associated with different activation files. Moreover, each of the two or more outputs may be tied to a same or different movement of the unfurling banner 224. In one aspect, when the unfurling banner 224 is moved out of the fully retracted closed position, a first output and a second output may be generated (e.g., the electronic module 231 generates playback of a stored audio file and activates lights included with the greeting card). In another aspect, when the unfurling banner 224 is moved out of the fully retracted closed position, a first output may be generated, and when the unfurling banner 224 is moved back to the fully retracted closed position a second output may be generated. For example, the first output may include a song, while the second output may include an audio message.

The first and second outputs may be implemented using a switch that triggers a first output when opened and a second output when closed. In one aspect, a slide switch is used. The slide switch can be positioned in the card and connected to the unfurling banner in such a way that movement of the banner away from the switch opens the circuit. The switch may be closed, therefore closing the circuit, when the banner returns to the fully closed position. Opening or closing the switch may be described as a change in switch status. In one aspect, a first audio file is played upon a change in switch status from open to closed and a second audio file is played when the switch status changes from closed to open. Similarly, lights or combinations of lights could be activated upon a switch status change. The different status changes (e.g., open to closed vs. closed to opened) can be mapped to different outputs in the electronic controller.

In further embodiments, the aspects related to a sound activation feature tied to a movement of the unfurling banner 224 (discussed above in reference to FIGS. 9-13) can be incorporated into the greeting cards 1, 101 in a variety ways to afford a sound activation feature that is tied to a movement of the unfurling banners 24, 124. Generally, the electronic component can include the electronic module, the switch, and the speaker, any of which can be positioned between two plies of the first or second subpanel and attached to an interior side of one ply. The switch can be attached to a location on the ply to allow a slider second end to be attached to the unfurling banners 24, 124 such that the switch activates the electronic module when the unfurling banners 24, 124 are unrolled and/or moved out of a closed position.

Many variations can be made to the illustrated embodiments of the present invention without departing from the scope of the present invention. Such modifications are within the scope of the present invention.

From the foregoing it will be seen that this invention is one well adapted to attain all ends and objects hereinabove set forth together with the other advantages which are clear following the complete disclosure above and which are inherent to the methods and apparatuses described herein. It will be understood that certain features and sub combinations are of utility and may be employed without reference to other features and sub combinations. This is contemplated by and is within the scope of the invention and claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

The invention claimed is:

1. An article having an unfurling banner, the article comprising:

a first panel and a second panel;

a self-retracting banner apparatus comprising a spool, a handle, and an unfurling banner having a first end attached to the spool and a second end attached to an exterior edge of the first panel, wherein the unfurling banner is moved out of a closed position when the handle is pulled by a user in a direction away from the exterior edge of the first panel; and an electronic component comprising an electronic module having one or more stored audio files, a speaker, and a switch attached to the unfurling banner, wherein the electronic module is activated by the switch changing status in response to the unfurling banner changing position.

2. The article of claim 1, wherein, when activated by the switch, the electronic module generates playback of a stored audio file over the speaker.

3. The article of claim 2, wherein, when activated by the switch, the electronic module activates one or more lights included in the article.

4. The article of claim 2, the unfurling banner being constructed from a plastic material having shape memory.

5. The article of claim 2, wherein the first panel and the second panel are attached and have generally equal dimensions.

6. The article of claim 5, wherein the electronic component is positioned between the first panel and the second panel.

7. The article of claim 6, wherein the electronic module, the speaker, and the switch are attached to an interior side of the first panel.

8. The article of claim 2, further comprising a card content on one or more of the first panel or the second panel and a banner content on the unfurling banner, wherein the card content and the banner content are related.

9. The article of claim 8, wherein the stored audio file is related to the card content and the banner content.

10. A greeting card having an unfurling banner and a sound activation feature comprising:

a first panel having at least a first subpanel and a second subpanel, the first subpanel and the second subpanel being separated by a fold in the first panel;

a second panel overlaid and attached to the first panel, the second panel having at least a third subpanel overlaid with the first subpanel of the first panel;

a self-retracting banner apparatus comprising a handle, a spool, and an unfurling banner having a first end attached to the spool and a second end attached to an exterior edge of the first subpanel, wherein the unfurling banner is moveable to and between a closed position and an open position; and an electronic component comprising an electronic module having one or more stored audio files, a speaker, and a switch attached to the unfurling banner;

wherein, when the unfurling banner is moved out of the closed position, the electronic module is activated by the switch, wherein, when the electronic module is activated, a stored audio file is played by the speaker.

11. The greeting card of claim 10, wherein the first panel forms and exterior portion of the greeting card and the second panel forms an interior portion of the greeting card.

12. The greeting card of claim 11, wherein the second end of the unfurling banner is attached to the exterior edge by adhering the second end between a first ply and a second ply that form the first subpanel.

13. The greeting card of claim 12, where the electronic module, the speaker, and the switch are attached to an interior side of the first subpanel.

14. The greeting card of claim 10, further comprising a card content on one or more of the first panel or the second panel.

15. The greeting card of claim 14, wherein the unfurling banner includes a banner content related to the card content.

16. The greeting card of claim 15, wherein the stored audio file includes an audio message related to the card content and the banner content.

17. The greeting card of claim 15, wherein the stored audio file includes a song related to the card content and the banner content.

18. A greeting card having an unfurling banner and a sound activation feature comprising:

a first panel having at least a first subpanel and a second subpanel, the first subpanel and the second subpanel being separated by a fold in the first panel, wherein the first subpanel includes an attachment tab;

a second panel overlaid and attached to the first panel, the second panel having at least a third subpanel positioned overlaying the first subpanel;

a connecting band attached to the attachment tab;

a self-retracting banner apparatus comprising a spool, a handle, and an unfurling banner having a first end attached to the spool and a second end attached to an exterior edge of the first subpanel, wherein the unfurling banner is moveable to and between a closed position and an open position; and an electronic component comprising an electronic module having one or more stored audio files, a speaker, and a switch having a first end attached to the connecting band and a second end attached to the unfurling banner, wherein the switch is moveable to and between an open position and a closed position, wherein, when the switch changes position, the electronic module is activated and a stored audio file is played by the speaker.

19. The greeting card of claim 18, wherein, when the unfurling banner is in the closed position, the connecting band positions the switch in the open position.

20. The greeting card of claim 19, wherein, when the unfurling banner is moved out of a closed position, the unfurling banner positions the switch in the closed position.

* * * * *